United States Patent
Hu et al.

(10) Patent No.: US 9,991,976 B2
(45) Date of Patent: Jun. 5, 2018

(54) METHOD AND APPARATUS FOR INTERFERENCE ESTIMATION IN WIRELESS COMMUNICATION NETWORKS

(71) Applicant: Huawei Technologies Co., Ltd., Shenzhen, Guangdong (CN)

(72) Inventors: Sha Hu, Shenzhen (CN); Fredrik Rusek, Lund (SE); Jianjun Chen, Lund (SE)

(73) Assignee: Huawei Technologies Co., Ltd., Shenzhen (CN)

(*) Notice: Subject to any disclaimer, the term of this patent is extended or adjusted under 35 U.S.C. 154(b) by 0 days. days.

(21) Appl. No.: 15/618,275

(22) Filed: Jun. 9, 2017

(65) Prior Publication Data

US 2017/0279547 A1    Sep. 28, 2017

Related U.S. Application Data

(63) Continuation of application No. PCT/EP2014/077366, filed on Dec. 11, 2014.

(51) Int. Cl.
*H04B 7/0456* (2017.01)
*H04B 17/336* (2015.01)
(Continued)

(52) U.S. Cl.
CPC ........ *H04B 17/336* (2015.01); *H04B 7/0456* (2013.01); *H04B 17/327* (2015.01);
(Continued)

(58) Field of Classification Search
CPC . H04L 1/0054; H04L 25/0202; H04L 25/021; H04L 25/0258; H04B 7/0456; H04B 17/336
(Continued)

(56) References Cited

U.S. PATENT DOCUMENTS

2012/0201152 A1    8/2012    Yoo et al.
2013/0107932 A1    5/2013    Scholand et al.
(Continued)

FOREIGN PATENT DOCUMENTS

WO    2009060023 A2    5/2009

OTHER PUBLICATIONS

Damnjanovic, Aleksandar, et al., "A Survey on 3GPP Heterogeneous Networks," IEEE Wireless Communications, Jun. 2011, pp. 10-21.
(Continued)

*Primary Examiner* — Emmanuel Bayard

(57) ABSTRACT

An apparatus including a processor configured to receive a digital communication signal, wherein the digital communication signal includes a common reference signal and transmitted data. The processor determines a first interfering channel matrix for a first interfering cell based on a channel estimation of the common reference signal, and estimates a first power offset ratio and a first effective pre-coding matrix for the first interfering cell by evaluating a maximum likelihood metric, wherein the maximum likelihood metric is based on a first interfering channel correlation. The processor then reconstructs a channel covariance matrix based on the estimated first power offset ratio and the first effective pre-coding matrix and detects the transmitted data based on the reconstructed channel covariance matrix.

20 Claims, 6 Drawing Sheets

(51) Int. Cl.
*H04L 25/02* (2006.01)
*H04B 17/327* (2015.01)
*H04L 1/00* (2006.01)

(52) U.S. Cl.
CPC .......... *H04L 1/0054* (2013.01); *H04L 25/021* (2013.01); *H04L 25/0226* (2013.01); *H04L 25/0246* (2013.01)

(58) Field of Classification Search
USPC .................................. 375/267, 299, 347–349
See application file for complete search history.

(56) References Cited

U.S. PATENT DOCUMENTS

| 2013/0148538 | A1* | 6/2013 | Ohwatari | H04B 7/0865 370/252 |
| 2013/0244676 | A1* | 9/2013 | Koivisto | H04L 5/0048 455/452.1 |
| 2013/0287132 | A1* | 10/2013 | Taoka | H04B 7/0452 375/267 |
| 2014/0140289 | A1* | 5/2014 | Moulsley | H04L 5/0053 370/329 |
| 2015/0029979 | A1* | 1/2015 | Onodera | H04W 72/121 370/329 |
| 2015/0358104 | A1* | 12/2015 | Ohwatari | H04B 7/0456 370/252 |
| 2016/0050601 | A1* | 2/2016 | Jeong | H04W 36/14 455/436 |
| 2016/0127018 | A1* | 5/2016 | Nammi | H04B 7/0417 375/267 |
| 2016/0173217 | A1* | 6/2016 | Sano | H04W 72/082 370/329 |
| 2016/0226538 | A1* | 8/2016 | Kim | H04B 1/123 |
| 2017/0366316 | A1* | 12/2017 | Kim | H04L 5/0048 |

OTHER PUBLICATIONS

Wrulich, Martin, et al., "Managing the Interference Structure of MIMO HSDPA: A Multi-User Interference Aware MMSE Receiver with Moderate Complexity," IEEE Transactions on Wireless Communications, vol. 9, No. 4, Apr. 2010, pp. 1472-1482.

3GPP TS 36.211 V 12.3.0 (Sep. 2014), 3rd Generation Partnership Project; Technical Specification Group Radio Access Network; Evolved Universal Terrestrial Radio Access (E-UTRA); Physical channels and modulation (Release 12), 124 pages.

3GPP TS 36.213 V12.3.0 (Sep. 2014), 3rd Generation Partnership Project; Technical Specification Group Radio Access Network; Evolved Universal Terrestrial Radio Access (E-UTRA); Physical layer procedures (Release 12), 212 pages.

* cited by examiner

METHOD AND APPARATUS FOR INTERFERENCE ESTIMATION IN WIRELESS COMMUNICATION NETWORKS

CROSS-REFERENCE TO RELATED APPLICATIONS

This application is a continuation of International Application No. PCT/EP2014/077366, filed on Dec. 11, 2014, the disclosure of which is hereby incorporated by reference in its entirety.

TECHNICAL FIELD

The aspects of the present disclosure relate generally to wireless communication systems and in particular to interference estimation in a wireless communications link.

BACKGROUND

The proliferation of modern wireless communications devices, such as cell phones, smart phones, and tablet devices, has seen an attendant rise in demand for large multimedia data capabilities for large populations of user equipment (UE) or mobile stations. These multimedia data can include streaming radio, online gaming, music, and TV at the UE. To support this ever increasing demand for higher data rates, multiple-access networks are being deployed based on a variety of transmission techniques such as time division multiple access (TDMA), code division multiple access (CDMA), frequency division multiple access (FDMA), orthogonal frequency division multiple access (OFDMA), and single carrier FDMA (SC_FDMA). New standards for wireless networks are also being developed. Examples of these newer standards include Long Term Evolution (LTE) and LTE-Advanced (LTE-A) being developed by the third generation partnership project (3GPP), the 802.11 and 802.16 family of wireless broadband standards maintained by the Institute of Electric and Electronic Engineers (IEEE), WiMAX, an implementation of the IEEE 802.11 standard from the WiMAX Forum, as well as others. Networks based on these standards provide multiple-access to support multiple simultaneous users by sharing available network resources.

Many of these newer standards support multiple antennas at both the base stations and the UE. These multi antenna configurations are referred at multi-input multi-output (MIMO) and provide improved spectral efficiency resulting in increased data rates. However these improvements come with a cost of increased complexity and computational requirements at the transmitter and receiver.

Increased demand for wireless service has prompted the installation of small cells to enhance coverage of cellular networks. A small cell is a base station or eNodeB having reduced power and coverage area and are often referred to as picocells or femtocells to indicate their reduced power levels as compared to the typical macro cell or macro eNodeB used in conventional cellular networks. A small cell may be used to extend or enhance coverage area such as inside large buildings, or they may be used to add network capacity in high traffic areas such as shopping malls, or train stations. Communication networks that include a mix of macro cells and small cells may be referred to as a heterogeneous network.

Wireless communication networks such as a heterogeneous network include multiple base stations to support downlink and uplink communications with multiple UE. Information sent from a UE to a base station is referred to as uplink communication, and information sent from a base station to a UE is referred to as a downlink communication. In a heterogeneous network the coverage area of small cells often overlaps the coverage area of other cells in the network causing uplink and downlink transmissions to be interfered by transmission of other cells, UE, or RF transmitters. This interference, if not properly accounted for in receivers, can significantly degrade performance of a communication network.

Interference and other distortions in the received signal can be accounted for by creating estimates of the radio channel and using these estimates to support detection of data symbols at the receivers. A common method of obtaining these estimates is to send known symbols, referred to as pilot symbols or reference symbols, in predetermined resource elements interspersed with the transmitted data. A resource element (RE) is the smallest useable portion of the radio spectrum consisting of one sub-carrier during one symbol period and has dimensions of frequency and time. Estimates of the radio channel can be created based on the received signal and knowledge of the pilot symbols. The pilot symbols sent by a particular base station may be referred to as a reference signal and the reference signal sent by all the base stations may be collectively referred to as a common reference signal (CRS). The CRS allow a receiver to determine channel estimates for both its primary data channel, the radio channel over which it is receiving data, as well as any interfering channels.

The reliability with which a receiver can accurately detect the transmitted data symbols is highly dependent on accurate estimation of the radio channel. Estimation of the primary radio channel which is the radio channel between the receiver and the transmitter from which the receiver is receiving its data, referred to herein as the data channel, improves a receiver's ability to detect the data symbols being transmitted. Estimations of radio channels between the receiver and interfering transmitters, referred to herein as the interfering channel, allows the receiver to compensate for distortion of the data signal caused by the interfering transmitters. Better interfering channel estimation results in improved data detection. Thus there is a need for improved methods and apparatus for estimating interfering radio channels in wireless communication networks.

SUMMARY

It is an object of the present disclosure to provide methods and apparatus to provide accurate estimates of interference for receivers operating in a heterogeneous network environment. A further object of the present disclosure to provide efficient methods and apparatus to determine accurate interference estimates with reduced computational requirements.

According to a first aspect of the present disclosure the above and further objects and advantages are obtained by an apparatus for receiving wireless communication signals in a heterogeneous network. The apparatus includes a processor configured to receive a digital communication signal, wherein the digital communication signal includes a common reference signal and transmitted data. The processor determines a first interfering channel matrix for a first interfering cell based on a channel estimation of the common reference signal, and estimates a first power offset ratio and a first effective pre-coding matrix for the first interfering cell by evaluating a maximum likelihood metric. The maximum likelihood metric is based on a first interfering channel correlation. The processor then reconstructs a channel covariance matrix based on the estimated first power offset ratio and the first effective pre-coding matrix and detects the transmitted data based on the reconstructed channel covariance matrix.

In a first possible implementation form of the apparatus according to the first aspect the processor is configured to evaluate the maximum likelihood metric based on an average covariance matrix. Use of an average covariance matrix reduces the computational complexity of evaluating the maximum likelihood metric.

In as second possible implementation form of the apparatus according to the first aspect as such or to the second possible implementation form of the first aspect the processor is configured to evaluate the maximum likelihood metric by generating a triangular matrix using Cholesky factorization of the first interfering channel correlation, inverting the triangular matrix, and evaluating the maximum likelihood metric based on a spectral decomposition of the inverted triangular matrix and a channel correlation. Use of factorization and decompositions yields an approximation that is both accurate and has significantly reduced computational cost.

In a third possible implementation form of the apparatus according to the first aspect as such or to any of the preceding first or second possible implementation forms of the first aspect the processor is configured to estimate a set of power offset ratios corresponding to a set of possible effective pre-coding matrices, wherein each power offset ratio in the set of power offset ratios corresponds to one possible effective pre-coding matrix in the set of possible effective pre-coding matrices, and wherein the set of power offset ratios are determined in parallel.

In a fourth possible implementation form of the apparatus according to the first aspect as such or to any of the preceding first through third possible implementation forms of the first aspect the processor is configured to reduce a size of the set of effective pre-coding matrices by evaluating a product of each effective pre-coding matrix and the conjugate transpose of the each effective pre-coding matrix, and removing an effective pre-coding matrix from the set of effective pre-coding matrices when the corresponding evaluated product is a duplicate of the evaluated product corresponding to another effective pre-coding matrix in the set of effective pre-coding matrices.

In a fifth possible implementation form of the apparatus according to the first aspect as such or to either of the third or fourth implementation forms of the first aspect the processor is configured to select the first power offset ratio from the set of power offset ratios based on the maximum likelihood metric.

In a sixth possible implementation form of the apparatus according to the first aspect as such or to any of the preceding first through fifth possible implementation forms of the first aspect the processor is configured to estimate a second power offset ratio and a second effective pre-coding matrix corresponding to a second interfering cell. The processor evaluates a maximum likelihood metric, wherein the maximum likelihood metric is based on the first interfering channel correlation and a second interfering channel correlation, and reconstructs the channel covariance matrix based on the estimated first power offset ratio, the second power offset ratio, the first effective pre-coding matrix, and the second effective pre-coding matrix.

In a seventh possible implementation form of the apparatus according to the first aspect as such or to the sixth possible implementation form of the first aspect the processor is configured to approximate a joint detection of the first power offset ratio and the second power offset ratio by estimating the first power offset ratio based on a maximum likelihood metric and estimating the second power offset ratio based on a linear relationship between the first power offset ratio and the second power offset ratio.

In an eighth possible implementation form of the apparatus according to the first aspect as such or to the seventh possible implementation form of the first aspect the processor is configured to select the first power offset ratio based on the interfering power of the first interfering cell and the interfering power of the second interfering cell, wherein the interfering power of the first interfering cell is greater than the interfering power of the second interfering cell.

In a ninth possible implementation form of the apparatus according to the first aspect as such or to any of the preceding sixth through eighth possible implementation forms of the first aspect the processor is configured to when the first interfering cell and the second interfering cell have substantially the same interfering power, select as the first interfering cell the interfering cell having better channel estimation accuracy.

In a tenth possible implementation form of the apparatus according to the first aspect as such or to any of the preceding first through ninth possible implementation forms of the first aspect the processor is configured to detect the transmitted data based on interference rejection combining type receivers.

In an eleventh possible implementation form of the apparatus according to the first aspect as such or to any of the preceding first through tenth possible implementation forms of the first aspect the processor is configured to select the first power offset ratio from a set of possible power offset ratios wherein the set of possible power offset ratios includes a zero value. Including a zero valued power offset ratio in the set of considered power offset ratios allows detection of interference to be accomplished at the same time as estimation of the power offset ratio thereby eliminating the need for a separate detection step.

According to a second aspect of the present disclosure the above and further objects and advantages are obtained by a method for estimating interference in a digital communication signal, wherein the digital communication signal includes a common reference signal and transmitted data. The method includes determining a first interfering channel matrix for a first interfering cell based on a channel estimation of the common reference signal, and estimating a first power offset ratio and a first effective pre-coding matrix for the first interfering cell by evaluating a maximum likelihood metric, wherein the maximum likelihood metric is based on a first interfering channel correlation. The method then reconstructs a channel covariance matrix based on the estimated first power offset ratio and the first effective pre-coding matrix and detects the transmitted data based on the reconstructed channel covariance matrix.

In a first possible implementation form of the method according to the second aspect evaluating the maximum likelihood metric is accomplished by generating a triangular matrix using Cholesky factorization of the first interfering channel correlation, inverting the triangular matrix, and evaluating the maximum likelihood metric based on a spectral decomposition of the inverted triangular matrix and a channel correlation.

According to a third aspect of the present disclosure the above and further objects and advantages are obtained by a computer program comprising program code that when executed by a processor cause the processor to perform the method according to the second aspect as such or to the first possible implementation form of the second aspect.

These and other aspects, implementation forms, and advantages of the exemplary embodiments will become apparent from the embodiments described herein considered in conjunction with the accompanying drawings. It is to be understood, however, that the description and drawings are designed solely for purposes of illustration and not as a definition of the limits of the disclosed disclosure, for which reference should be made to the appended claims. Additional aspects and advantages of the disclosure will be set forth in the description that follows, and in part will be obvious from the description, or may be learned by practice of the disclosure. Moreover, the aspects and advantages of the disclosure may be realized and obtained by means of the instrumentalities and combinations particularly pointed out in the appended claims.

BRIEF DESCRIPTION OF THE DRAWINGS

In the following detailed portion of the present disclosure, aspects will be explained in more detail with reference to the example embodiments shown in the drawings, in which.

DETAILED DESCRIPTION

Figure 1:
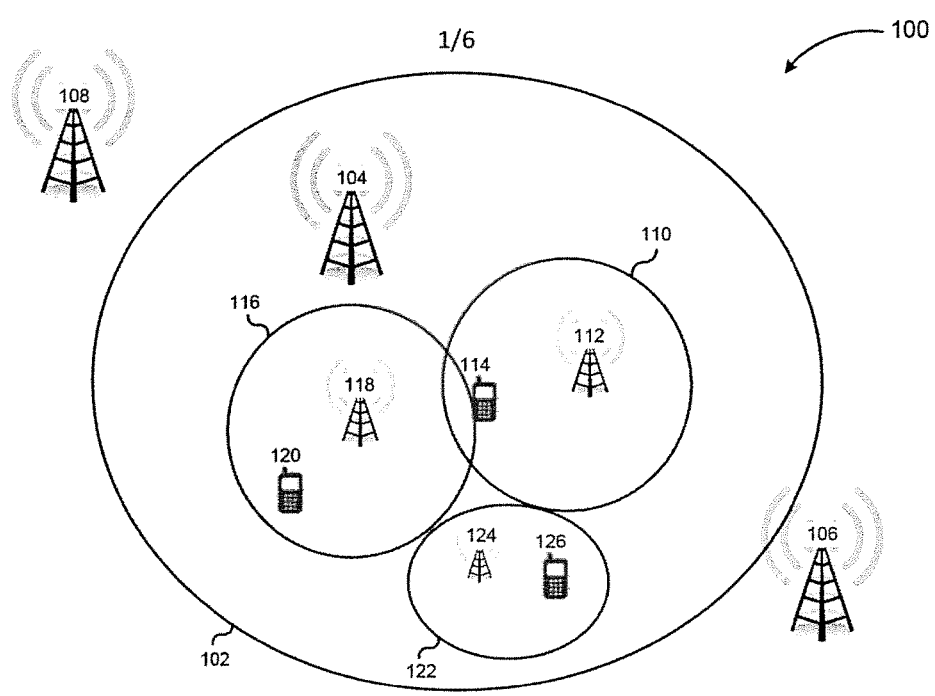
FIG. 1 illustrates a wireless network in which the disclosed embodiments may be advantageously employed.

FIG. 1 illustrates a wireless network 100, such as a LTE-A or other multiple-access wireless network, in which the interference estimation embodiments disclosed herein may be advantageously employed. The wireless network 100 includes a number of access nodes 104, 106, 108, 112, 118, 124 which may be an evolved NodeB (eNodeB), base station or other appropriate type of wireless access node configured to provide wireless access to user equipment (UE) or mobile stations 114, 120, 126 requiring service from the wireless network 100. Each access node 104, 106, 108, 112, 118, 124 is configured to provide network coverage to UE 114, 120, 126 in an associated geographic region (or coverage area) 102, 110, 116, 122 being served by the access node. Access nodes, such as access node 104, having a relatively higher power provide service to a relatively large physical area or coverage area 102 and typically include one or more radio towers. The term cell may refer to the coverage area 102, 110, 116, 122 of an access node or to both the coverage area 102, 110, 116, 122 and the associated access node 104, 112, 118, 124 depending on the context in which the term cell is used. It is often the case that certain areas within a wireless network 100, such as the interior of large office buildings and high traffic areas such as shopping malls or train stations are not serviced well by the macrocells (such as the cell 102 associated to access node 104) within the wireless network 100. To extend coverage to poorly covered areas or increase capacity in high traffic areas it is common to deploy lower power access nodes 112, 118, 110, 116 which may be referred to as small cells to indicate they are lower power than the macro cells. These small cells may be referred to with various terms including picocells or femtocells to indicate their reduced power levels as compared to the macrocells. These small cells 110, 116, 122 often have coverage areas 110, 116, 122 that overlap each other and/or overlap the coverage area of the macro cells 102. When a wireless network 100 includes multiple cells 102, 110, 116, 122, and especially when the cells 102, 110, 116, 122 overlap as is the case with small cells 110, 116, 118 overlapping the macrocell 102 and with small cells 110 and 116 overlapping each other, there may be a large amount of inter-cell interference (ICI).

For example a UE 120 communicating with access node 110 may receive interfering signals from the macrocell access node 104. Similarly, a UE 114 at the cell edge region of small cell 110 may receive interference from both the overlapped macrocell 102 and a neighboring small cell 116. This ICI can significantly degrade the through put of the UE 114, 120.

In the downlink, such as the downlink in a LTE network, the eNodeB provides multiple-access by scheduling different time-frequency resources to different users. The smallest individually schedulable radio resource may be referred to as a physical resource block (PRB) and is made up of a number of resource elements (RE). For example, in one LTE implementation a PRB may span 12 subcarriers during 14 time slots yielding 168 RE in each PRB. The physical link between an access node and a UE is organized into a number of physical channels mapped to different portions, i.e., different time/frequency resources, of the physical radio link.

In a LTE network the channels include a physical broadcast channel (PBCH) used to provide several basic parameters essential for initial access of a cell, a physical downlink shared channel (PDSCH) used as the main data bearing channel, a physical downlink control channel (PDCCH) used to provide resource assignment specific to a UE, as well as other physical channels. Certain embodiments disclosed herein are presented using terminology consistent with the radio channels used in a LTE type wireless network, however this is done only as an aid to understanding and those skilled in the art will readily recognize that the disclosed methods and apparatus may be advantageously employed in other types of wireless networks without straying from the spirit and scope of the present disclosure.

Figure 2:
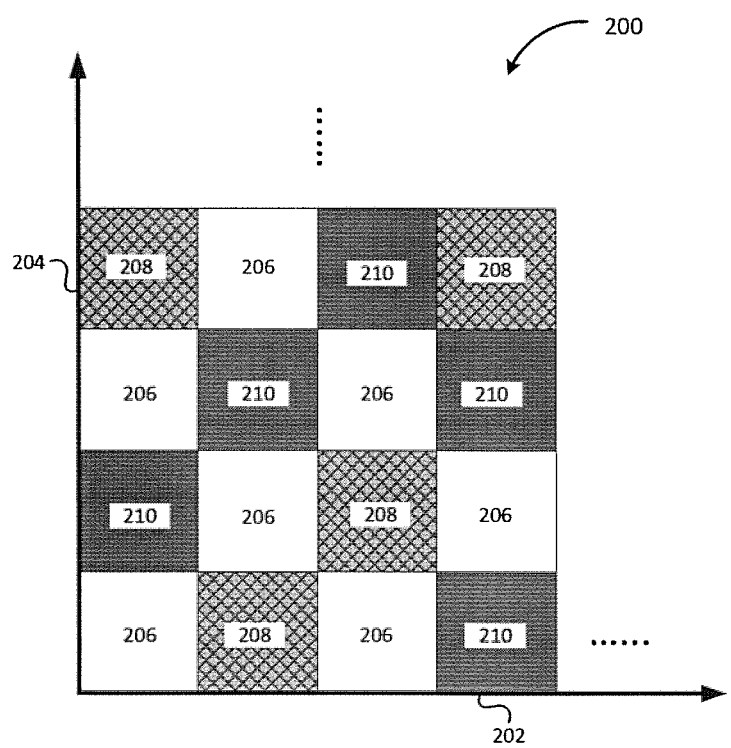
FIG. 2 illustrates a graphical representation of an interference allocation pattern incorporating aspects of the present disclosure.

Transmit power used to send data to each UE may be different resulting in varying amounts of interference in each PRB. FIG. 2 illustrates a graphical representation 200 of an interference allocation pattern for a UE such as UE 114. In the graph 200, time is represented along the horizontal axis 202 and frequency is represented along the vertical axis 204 with each square, such as squares 206, 208, 210 being used to represent individually scheduled PRBs. During certain PRBs 206 the UE 114 is not interfered by any other UE 120, 126, and during other PRBs 208 the UE 114 is interfered by UE 120, and during certain PRBs 210 the UE 114 is interfered by UE 126.

When a UE is in a location where it receives signals from multiple cells, such as the UE 120 receiving signals from both the macrocell 102 and small cell 116, an ability to compensate for signals from an interfering cell is desirable. Transmission parameters for individual UE are provided over a PDCCH and it follows that decoding the PDCCH information of an interfering cell would aid cancellation of interference. However, attempts to decode PDCCH information transmitted to users in interfering cells results in an exhaustive search of all possible PDCCH positions. Further, lacking knowledge of identifiers used for individual UE in the interfering cell, it is not feasible to decode the PDCCH information. Therefore there is no information about the allocation patterns of the interferers available at the interfered receiver and interference needs to be treated separately on a PRB basis.

Channel estimates of the serving cell, i.e., the cell from which a UE is receiving its data, and interfering cells may be obtained through cell search and channel estimation techniques based on CRS. However, even when accurate estimates are available, the power ratio between the CRS on which the estimates were based, and the data transmitted by the interfering cells is uncertain. In LTE networks such as for example networks based on the 3GPP Technical Specification 36.213 describing physical layer procedures for Evolved Universal Terrestrial Radio Access (E-UTRA), this power ratio between the CRS and data of the interfering cells is typically determined by two parameters $P_A$ and $P_B$. These can be found using two parameters: $\rho_B$ denotes the power ratio between the PDSCH data and the CRS at the OFDM symbols that are carrying the CRS, and $\rho_A$ denotes the power ratio between the PDSCH data and the CRS at the OFDM symbols that are not carrying the CRS, and $P_B$ becomes: $P_B = \rho_B / \rho_A$, which is an unknown cell specific parameter of the interfering cell. However, once $\rho_A$ and $P_B$ are known, $\rho_B$ can be calculated. $\rho_A$ is equal to $P_A$ plus an offset configured by a higher signaling layer of the interfering cell. Therefore the interference estimation is focused on estimation of the UE specific power ratio $P_A$. The cell specific ratio $P_B$ which is much easier to detect based on the received interfering signals, is assumed to be known.

Another unknown that is needed for interference estimation is the transmission mode of the interfering cell. Bandwidth and antenna number of the interfering cell can be obtained by decoding the physical broadcast channel (PBCH). Each of the different transmission modes may use a different effective layer to antenna port mapping matrix. As used herein the term effective pre-coding matrix refers to all of the matrix operations at the access node or eNodeB before transmission for example matrix operations such as the cyclic delay diversity matrix, pre-coding matrix, large delay diversity matrix etc. Another example is the matrix operations defined in the 3GPP Technical Specification 36.211 describing the physical channels and modulation for E-UTRA. In this physical channel, a 2×2 multi-input multi-output (MIMO) transmission has both a transmit and receive antenna number of 2. Under transmission mode 2 for space frequency block coding (SFBC), mode 3 for open loop spatial multiplexing (OLSM), and mode 4 for closed loop spatial multiplexing (CLSM) with a rank of 2, the effective pre-coding matrix is unary. However, under the transmit modes 3 and 4 with a rank of 1, the effective pre-coding matrix is not full rank. Therefore, in order to accurately model the interference for estimation, the effective pre-coding matrix and the power ratio need to be jointly detected.

One Dominating Interferer

Depending on the location of the UE and the wireless network topology, a receiver may experience inference from one or more dominating interferes. In a first exemplary embodiment, interference from a single dominating interferer is estimated and the remaining interferes, if any, are treated along with the thermal noise. Further exemplary embodiments will be presented below that extend the methods and apparatus to two or more dominating interferes. Equation 1 shows a linear received signal model for one dominating interferer and thermal noise:

$$Y(n) = H(n)X(n) + \sqrt{\beta} G(n)W(n)T(n) + V(n), \quad 0 \leq n < N. \qquad \text{Eq. 1}$$

In Equation 1, n is the RE index and N is the total number of RE available for interference estimation. Y(n) is the received column vector for the n-th RE used for PDSCH data transmission, H is the channel matrix for serving cell and G is the channel matrix for interfering cell. The power ratio and effective pre-coding matrix for the serving cell are known and are included in the serving cell channel matrix H. For the interfering cell, the interfering cell channel matrix G may be estimated based on CRS, but the power ratio value, denoted as $\beta$, and the effective pre-coding matrix, denoted as W, are unknown. The serving cell data, which needs to be detected, is denoted as X, and the interfering cell data which is an unknown is denoted as T. Thermal noise, together with other interference from other cells, is denoted as V and is assumed to obey the Gaussian distribution $N(0, \sigma^2 I)$, where I is the identity matrix.

In certain interference allocation patterns, such as the interference allocation pattern 200 described above, there may be no interference in some PRB. When there is no interference the power ratio value $\beta$ may be modeled as having a zero value: $\beta = 0$. With this modeling definition the interference detection, i.e. whether interference exists or not, and the interference estimation problem are unified into a single problem.

In conventional systems detection and estimation of interference is based on received signal power. The method used in these conventional systems computes the correlation matrix of the received signal by averaging multiple RE positions within a single PRB as shown in Equation 2:

$$\begin{aligned} R_{yy} &= E(Y(n)Y(n)^H) \\ &= E\big((H(n)X(n) + \sqrt{\beta}\, G(n)W(n)T(n) + V(n)) \\ &\quad (H(n)X(n) + \sqrt{\beta}\, G(n)W(n)T(n) + V(n))^H\big) \\ &\approx E(H(n)X(n)X(n)^H H(n)^H) + \\ &\quad \beta E(G(n)W(n)T(n)T(n)^H W(n)^H G(n)^H) + \sigma^2 I \\ &\approx E(H(n)H(n)^H) + \\ &\quad \beta E(G(n)W(n)T(n)T(n)^H W(n)^H G(n)^H) + \sigma^2 I \\ &= R_H + \beta R_G^W + \sigma^2 I, \end{aligned} \qquad \text{Eq. 2}$$

where $R_{yy}$ denotes the correlation of the received signal or the data correlation, $E(\bullet)$ is the expected value function, for example an average, and the superscript $^H$ represents the Hermitian conjugate transposition operator. In Equation 2 the serving cell channel correlation is $R_H = E(H(n)H(n)^H)$, and the interfering cell channel correlation is $R_G^W = E(G(n)W(n)T(n)T(n)^H W(n)^H G(n)^H)$, where the super script $^W$ and subscript $_G$ indicate that the interfering cell channel correlation is dependent on the interfering cell channel matrix G and the pre-coding matrix W. The resulting data correlation $R_{yy}$ is then compared with the channel correlation $R_H$ to detect whether the interference exists or not as illustrated in Equation 3:

$$tr(R_{yy} - R_H) \approx tr(\beta R_G^W + \sigma^2 I) > \text{Threshold}. \qquad \text{Eq. 3}$$

The covariance matrix to be used for equalization is then selected between the data correlation $R_{yy}$ and the channel correlation $R_H$ based on comparison with a threshold value as shown in Equation 3. Once the correlation R is selected, the data estimation may be found based on interference cancellation combining as illustrated in Equation 4:

$$\tilde{X} = \frac{H^H R^{-1}}{H^H R^{-1} H} Y, \qquad \text{Eq. 4}$$

where $\tilde{X}$ is the estimation of the transmitted data. Interference rejection combining (IRC) is a weighting strategy for detectors with access to approximate channel state information and/or distortion distribution knowledge. The noise covariance matrix after IRC is given by Equation 5:

$$\tilde{\sigma}^2 = \frac{1}{H^H R^{-1} H}. \qquad \text{Eq. 5}$$

Bit log likelihood ratios (LLR) can then be calculated based on the estimated symbols $\tilde{X}$ and the effective noise $\tilde{\sigma}^2$ before passing into the decoder.

A disadvantage of this method is accuracy of the data covariance matrix $R_{yy}$. Since the detection is based on a single PRB, the available number of REs results in an approximation, $E(H(n)X(n)X(n)^H H(n)^H) \approx E(H(n)H(n)^H)$, that does not hold well, especially for higher order symbol modulation schemes such as quadrature amplitude modulation with 16 or 64 constellation points (QAM-16 or QAM-64), leading to estimation error and degraded performance. For example, in certain LTE wireless networks a PRB has a total of 168 REs. Once the REs used for CRS and the PDCCH are removed the number of REs remaining for computation of the expected value is significantly smaller than 168 and may be too small for reliable estimation.

In addition to estimation error, since the power ratio value β and the effective pre-coding matrix W are not known, the threshold value is difficult to determine. The power ratio value β and the effective pre-coding matrix W must be considered in order to improve performance. A better criterion can be achieved using an error matrix as shown by Equation 6:

$$Err = R_{yy} - R_H - \beta R_G^W + \sigma^2 I. \qquad \text{Eq. 6}$$

The optimal power ratio value β and the effective pre-coding matrix W can be obtained by minimizing a metric based on the error matrix as shown in Equation 7:

$$(\tilde{\beta}, \tilde{W}) = \underset{\beta, W}{\operatorname{argmin}} f(Err). \qquad \text{Eq. 7}$$

Here $f(\bullet)$ is a proper metric function such as a matrix tree, Frobenius norm, or Taxicab norm. However the performance of this method is suboptimal as compared with the maximum likelihood based methods describe below.

An essential part of the IRC data estimation technique is accuracy of the channel covariance matrix estimation R. The channel covariance matrix estimation R is derived from the power offset ratio value β, the thermal noise power $\sigma^2$, and the interfering cell channel correlation $R_G^W$ as shown in Equation 8:

$$R = \beta R_G^W + \sigma^2 I. \qquad \text{Eq. 8}$$

The interfering channel matrix G and the the thermal noise power $\sigma^2$ are assumed to be known based on the channel estimation derived from the CRS. One unknown value is the power offset ratio β between the PDSCH symbols and the CRS, and a second unknown is the effective pre-coding matrix which is related to the transmission mode. The quality of the channel covariance matrix estimation R is strongly dependent on these two unknown quantities. Once these unknown values have been determined the covariance matrix R can be determined using Equation 8.

Because there is no information available for the interference allocation pattern, such as interference allocation pattern 200 described above, estimation of the power offset ratio β and the effective pre-coding matrix W can be based only a single PRB at a time. With the received signal model for each RE position n shown in Equation 1, the probability distribution function (PDF) of the received signal, $P(Y_0, Y_1, \ldots, Y_{N-1})$, is determined as shown in Equation 9:

$$P(Y_0, Y_1, \ldots, Y_{N-1}) = \qquad \text{Eq. 9}$$
$$\prod_{n=0}^{N-1} P(Y_n) = \prod_{n=0}^{N-1} \frac{1}{\pi^K \det(R_n^{W,\beta})} \exp(-Y_n^H (R_n^{W,\beta})^{-1} Y_n),$$

where $\det(\bullet)$ is the matrix determinant operation, $\exp(\bullet)$ represents raising Euler's constant (e) to a power $(\bullet)$, $\Pi$ is the product operator representing in this case the product of a set of N probabilities $P(Y_n)$, K is the number of receive antennas, and N is the total number of RE containing data symbols in the PRB. In Equation 9 the covariance matrix $R_n^{W,\beta}$ of the n-th RE for a particular power ratio value β and effective pre-coding matrix W is given by Equation 10:

$$R_n^{W,\beta} = H(n)H(n)^H + \beta G(n)W(n)T(n)T(n)^H W(n)^H G(n)^H + \sigma^2 I. \qquad \text{Eq. 10}$$

Taking the natural logarithm of the probability distribution function of the received signal, $P(Y_0, Y_1, \ldots, Y_{N-1})$, yields the result shown in shown in Equation 11:

$$\ln(P(Y_0, Y_1, \ldots, Y_{N-1}) \mid \beta) = \qquad \text{Eq. 11}$$
$$\ln\left(\prod_{n=0}^{N-1} P(Y_n)\right) \propto -\sum_{n=0}^{N-1} \left(\ln(\det(R_n^{W,\beta})) + Y_n^H (R_n^{W,\beta})^{-1} Y_n\right),$$

where ln represents the natural logarithm operator, Σ is the summation operator representing the sum of a set of N values, and ∝ represents proportionality. A maximum likelihood (ML) or maximum log likelihood (MLL) metric $\gamma(\beta, W)$ can be defined as shown in Equation 12:

$$\gamma(\beta, W) = \sum_{n=0}^{N-1} \left(\ln(\det(R_n^{W,\beta})) + Y_n^H (R_n^{W,\beta})^{-1} Y_n\right). \qquad \text{Eq. 12}$$

The power ratio value β and effective pre-coding matrix W can then be detected based on the ML criteria shown in Equation 13:

$$(\tilde{\beta}, \tilde{W}) = \underset{\beta \in \Omega}{\operatorname{argmax}} \{ \ln(P(Y_0, Y_1, \ldots, Y_{N-1}) \mid \beta)\} = \underset{\beta \in \Omega, W}{\operatorname{argmin}} \gamma(\beta, W), \qquad \text{Eq. 13}$$

where Ω is the set of possible power ratio values β. For example in certain wireless networks defined by the 3GPP there are 8 possible power ratio values {−6, −4.77, −3, −1.77, 0, 1, 2, 3} where the values have units of decibels (dB). In certain PRB there may be substantially no interference, such as in an Almost Blank Sub-frame (ABS) scenario in LTE/LTE-A where CRS of the interfering cell are transmitted but no data is transmitted. To account for ABS, or PRB where there is no interference, an extra value {−inf} dB representing negative infinity dB corresponding to a linear ratio value of $\beta=0$ is added to the set $\Omega$. The resulting power ratio set $\Omega$ for the above described 3GPP example is shown in Equation 14:

$$\Omega=\{-inf,-6,-4.77,-3,-1.77,0,1,2,3\}dB. \quad \text{Eq. 14}$$

Computational complexity is a concern due to both the limited computational capabilities of low end UE and for power consumption. In order to reduce the computational complexity, an average covariance matrix $R(\beta,W)$ may be used to simplify calculation of the ML metric $\gamma(\beta,W)$. Equation 15 illustrates a derivation for reduced complexity ML metric $\gamma(\beta,W)$ that is proportional to the more complex ML metric shown in Equation 15:

$$\gamma(\beta, W) = \sum_{n=0}^{N-1} \left( ln(\det(R_n^{W,\beta})) + Y_n^H (R_n^{W,\beta})^{-1} Y_n \right) \quad \text{Eq. 15}$$

$$\approx N ln(\det(R(\beta, W))) + \sum_{n=0}^{N-1} (Y_n^H R(\beta, W)^{-1} Y_n)$$

$$= N ln(\det(R(\beta, W))) + tr\left( \sum_{n=0}^{N-1} (R(\beta, W)^{-1} Y_n Y_n^H) \right) \propto$$

$$ln(\det(R(\beta, W))) + tr(R(\beta, W)^{-1} R_{yy}).$$

In Equation 15 the average covariance matrix $R(\beta,W)$ can be defined as shown in Equation 16:

$$R(\beta, W) = \frac{1}{N} \sum_{n=0}^{N-1} R_n^{W,\beta} = \frac{1}{N} \sum_{n=0}^{N-1} (H(n)H(n)^H + \quad \text{Eq. 16}$$
$$\beta G(n) W(n) T(n) T(n)^H W(n)^H G(n)^H + \sigma^2 I)$$
$$= R_H + \beta R_G^W + \sigma^2 I$$

With the definitions shown in Equation 16 the channel correlation $R_H$, the interfering channel correlation $R_G^W$, and the correlation of the received data $R_{yy}$ can be obtained as shown in Equation 17:

$$R_H = \frac{1}{N} \sum_{n=0}^{N-1} (H(n)H(n)^H), \quad \text{Eq. 17}$$

$$R_G^W = \frac{1}{N} \sum_{n=0}^{N-1} (G(n)W(n)W(n)^H G(n)^H),$$

$$R_{yy} = \frac{1}{N} \sum_{n=0}^{N-1} (Y(n)Y(n)^H)$$

The ML metric $\gamma(\beta,W)$ can now be calculated for all possible power ratio values, $\beta \in \Omega$, using the reduced complexity calculations shown in Equations 15, 16, and 17, and the best power ratio $\beta$ in a ML sense for a given pre-coding matrix W can be selected as illustrated in Equation 13.

Calculating the ML metric $\gamma(\beta,W)$ directly as illustrated in Equations 15, 16, and 17 can be very complex because the average correlation matrix $R(\beta,W)$ needs to be inverted for every possible power ratio value $\beta$. For example in the previously presented LTE example, the average correlation matrix $R(\beta,W)$ needs to be inverted 9 times, once for each power ratio value shown in Equation 14, and for each pre-coding matrix value. The complexity becomes very large when there are multiple pre-coding matrix possibilities as in MIMO configurations, such as 4×4 MIMO or larger.

Factoring and decomposition techniques can be used to reduce the complexity of the matrix inversion. With Cholesky factorization, also known as Cholesky decomposition, the interfering channel correlation $R_G^W$ can be rewritten as the product of two triangular matrices as shown in Equation 18:

$$R_G^W = LL^H, \quad \text{Eq. 18}$$

where L is an upper triangular matrix. Next, assume spectral decomposition of the quantity $L^{-1}(R_H+\sigma^2 I)(L^{-1})^H$ as illustrated in Equation 19:

$$V\Sigma V^H = L^{-1}(R_H+\sigma^2 I)(L^{-1})^H, \quad \text{Eq. 19}$$

where V is a unitary matrix and $\Sigma$ is a corresponding diagonal matrix: $\Sigma = \text{diag}(\lambda_0 \ \lambda_1 \ \ldots \ \lambda_{K-1})$ formed from the Eigenvalues $\lambda$. With the assumptions shown in Equation 18 and Equation 19, the inverse average correlation matrix $R(\beta,W)^{-1}$ can be found as shown in Equation 20:

$$R(\beta, W)^{-1} = (R_H + \beta LL^H + \sigma^2 I)^{-1} \quad \text{Eq. 20}$$
$$= (L^{-1})^H \left( L^{-1}(R_H + \sigma I^2)(L^{-1})^H + \beta I \right)^{-1} L^{-1}$$
$$= (L^{-1})^H V \left( \sum + \beta I \right)^{-1} V^H L^{-1}.$$

The ML metric calculation can now be simplified as illustrated in Equation 21:

$$\gamma(\beta, W) = ln(\det(R(\beta, W))) + tr(R(\beta, W)^{-1} R_{yy}) = \quad \text{Eq. 21}$$
$$ln\left(\det\left((L^{-1})^H V (\Sigma + \beta I)^{-1} V^H L^{-1}\right)\right) +$$
$$tr\left\{ (L^{-1})^H V (\Sigma + \beta I)^{-1} V^H L^{-1} R_{yy} \right\} =$$
$$ln\left(\det\left((L^{-1})^H V (\Sigma + \beta I)^{-1} V^H L^{-1}\right)\right) +$$
$$tr\left\{ (\Sigma + \beta I)^{-1} V^H L^{-1} R_{yy} (L^{-1})^H V \right\} \propto ln(\det(\Sigma + \beta I)) +$$
$$tr\{(\Sigma + \beta I)^{-1} D_{yy}\} = \sum_{i=0}^{M-1} ln(\lambda_i + \beta) + \sum_{i=0}^{M-1} \frac{D_{yy}^i}{\lambda_i + \beta},$$

where $D_{yy}^i$ is the $i^{th}$ diagonal element of matrix $D_{yy}=V^H L^{-1} R_{yy} (L^{-1})^H V$. The best power ratio estimate $\hat{\beta}_W$ for a given pre-coding matrix, in a ML sense, can be selected as illustrated in Equation 22:

$$\hat{\beta}_W = \underset{\beta \in \Omega}{\operatorname{argmin}} \gamma(\beta, W) = \underset{\beta \in \Omega}{\operatorname{argmin}} \left\{ \sum_{i=0}^{K-1} ln(\lambda_i + \beta) + \sum_{i=0}^{K-1} \frac{D_{yy}^i}{\lambda_i + \beta} \right\}. \quad \text{Eq. 22}$$

Because the Eigenvalues $\lambda_i$ and diagonal elements $D_{yy}^i$ are dependent on the pre-coding matrix W and not on the power ratio $\beta$, the Eigenvalues and diagonal elements only need to be calculated once for each possible correlation result of the effective pre-coding matrix $WW^H$. Thus, the complexity of computing the ML metric $\gamma(\beta,W)$ is significantly reduced from the direct matrix inversion shown in Equation 15. For each possible power ratio value β∈Ω, a few scalar operations are all that is required to complete computation of the ML metric as shown in Equation 22.

The power ratio value for each pre-coding matrix is dependent only on the corresponding pre-coding matrix value, thus the power ratio for each effective pre-coding matrix value can be selected in parallel. For example when there are P different assumptions for the possible effective pre-coding matrices $\{W^p\}_{p=0,1,\ldots,P-1}$, the process can be done in parallel for each different assumption. Parallel processing of each effective pre-coding matrix assumption reduces the amount of time required to complete the estimate. At times it is also possible to reduce the amount of processing necessary by reducing the number of effective pre-coding matrix assumptions that need to be considered. During computation of the estimates it is necessary to form the product of each effective-pre-coding matrix assumption with its Hermitian transpose, i.e. $W^P(W^P)^H$. If two of the effective pre-coding matrix assumptions have the same value for this product $W^P(W^P)^H$, it is only necessary to compute an estimate for one of them. Thus, when more than one effective pre-coding matrix assumption has the same value for this product $W^P(W^P)^H$ there is no need to compute an associated estimate. Therefore the number of parallel processes to be correspondingly reduced by eliminating these duplicates.

Figure 3:
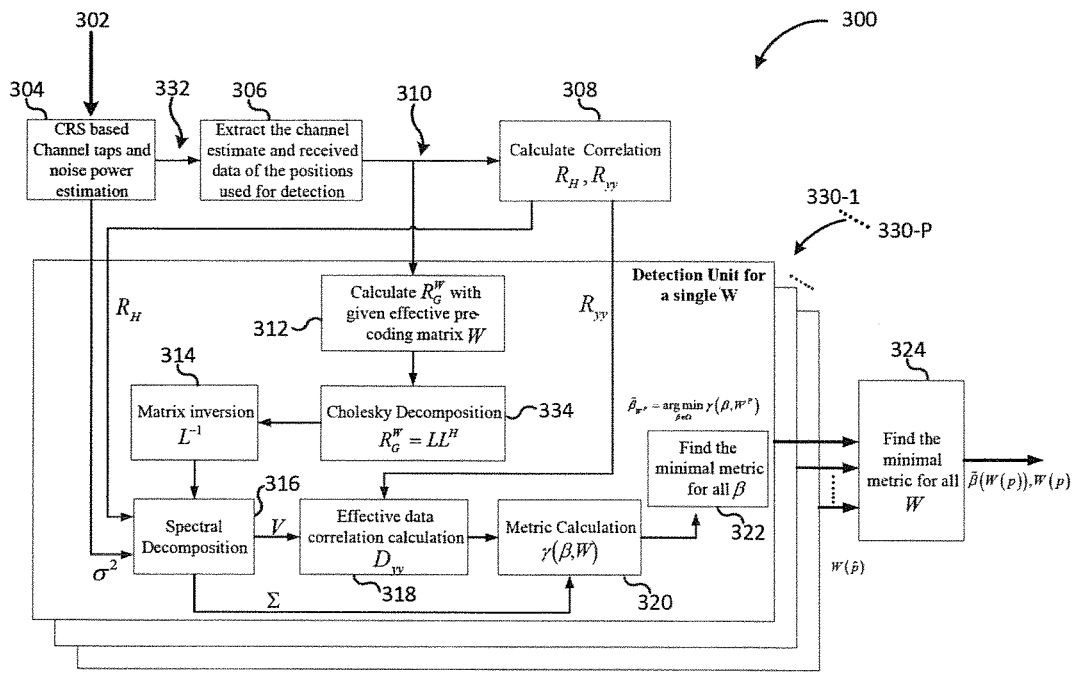
FIG. 3 illustrates a flow chart of an ML based power ratio detection process for a single dominating interferer incorporating aspects of the disclosed embodiments.

FIG. 3 illustrates a flow chart of an exemplary embodiment of a ML based power ratio detection process 300 as performed by a processor if an apparatus according to an embodiment of the present disclosure for a single dominating interferer. Received radio frequency signals are down converted and appropriately pre-processed, then the resulting baseband signal is digitally sampled, such as with an analog to digital converter, to create a received digital communication signal 302. CRS based channel taps and noise power estimation are used to extract 304 noise power estimates $\sigma^2$ and channel estimates 332. Next, the channel estimates 332 and received data 310 of the positions used for detection are extracted 306, and, the data correlation $R_{yy}$ and the channel correlation $R_H$ are calculated 308. Separate processing for each pre-coding matrix value is represented by a set of P detection units 330-1 through 330-P where P is the number of effective pre-coding matrix assumptions being considered as described above. Each detection unit 330-1 through 330-P receives the noise power estimates $\sigma^2$, channel estimates 332, data correlation $R_{yy}$, and channel correlation $R_H$, which were derived from the digital communication signal 302, and all the detection units 330-1 through 330-P use the same process to determine a power ratio estimate $\hat{\beta}_{W^p}$ for each effective pre-coding matrix assumption $W^P$. An interfering channel correlation $R_G^W$ is calculated 312 for example as illustrated in Equation 17, based on the particular effective pre-coding matrix assumption $W^P$. Cholesky decomposition is performed 334 to create a triangular matrix L as illustrated in Equation 18. The triangular matrix L is then inverted 314 to create an inverse matrix $L^{-1}$. Spectral decomposition 316 is applied to the channel correlation $R_H$, noise power $\sigma^2$, and inverted triangular matrix $L^{-1}$ as illustrated in Equation 19 to create a unitary matrix V and a corresponding diagonal matrix $\Sigma$. The effective data correlation $D_{yy}$ is calculated 318 from the received data correlation $R_{yy}$ and the unitary matrix V. The metric calculations 320 can then be performed on the data correlation $D_{yy}$ and the diagonal matrix $\Sigma$ as illustrated in Equation 21. The best power ratio estimate $\hat{\beta}_{W^p}$ in an ML sense is then selected 322 based on the metric calculations 320. Finally, the best effective pre-coding matrix W($\hat{p}$) is found 324 by minimizing the ML metric as illustrated in Equation 23:

$$W(\hat{p}) = \underset{0 \leq p < P}{\mathrm{argmin}} \gamma\big(\tilde{\beta}(W(p)), W(p)\big). \qquad \text{Eq. 23}$$

Once the best effective pre-coding matrix W($\hat{p}$) and associated best power ratio estimate $\tilde{\beta}(W(\hat{p}))$ have been determined, the channel covariance matrix can be reconstructed as shown in Equation 24:

$$R = \tilde{\beta}(W(\hat{p})) R_G^{W(\hat{p})} + \sigma^2 I. \qquad \text{Eq. 24}$$

IRC can then be implemented using the reconstructed channel covariance matrix. This gives a more accurate covariance matrix estimation for IRC receiver and therefore provides a better data detection performance.

Two Dominating Interferers

In certain circumstances a UE operating in a heterogeneous wireless network, such the wireless network 100 described above, may experience interference form two or more strong interferers. In these situations it would be desirable to estimate and suppress interference from multiple sources. An exemplary embodiment (i.e. a method and an apparatus) for estimating and suppressing interference from two strong interferers can be created based on the single interferer embodiment presented above. Those skilled in the art will readily recognize that the methods disclosed herein can be extended to estimate three or more strong interferers in a fashion similar to the illustrated extension to two interferers.

Interference estimation for two dominating interferers is significantly more complex than for one dominant interferer. This is because the complexity increases exponentially for a joint ML estimation of all the parameters being estimated. To mitigate the increased complexity, the two dominant interferer embodiment employs an approximated ML detection method. Each dominating interferer requires detection of a different power ratio value so a linear relationship is built between the two power ratio values and used to decide which power ratio value will be estimated first. Then the ML metric can be approximated based on the selected one power ratio value and two effective pre-coding matrices corresponding to the two interferers. For each combination of the two effective pre-coding matrices, ML estimation of the selected power ratio is simplified using the techniques described above for a single dominating interferer. The best estimation of two effective-pre-coding matrices is found over all possibilities through minimizing the ML metric. A second power ratio value can then be estimated based on the first power ratio estimate and the linear relationship between the two power ratios. This approximate method provides significantly reduced complexity than exact ML and renders good performance.

The two dominant interferer embodiment uses a received signal model as shown in Equation 25:

$$Y = HX + \sqrt{\beta_0} G_0 W_0 T_0 + \sqrt{\beta_1} G_1 W_1 T_1 + N, \qquad \text{Eq. 25}$$

where the subscripts 0 and 1 correspond to the first and second dominant interferer being considered. With this received signal model two power ratio parameters ($\beta_0, \beta_1$) and two effective pre-coding matrices $W_0, W_1$ need to be estimated jointly. The ML metric previously defined in Equation 16 and Equation 17 changes for the embodiment with two dominating interferers as shown in Equation 26:

$$\gamma(\beta_0,\beta_1,W_0,W_1) \propto ln(det(R(\beta_0,\beta_1,W_0,W_1))) + tr(R(\beta_0,\beta_1,W_0,W_1)^{-1}R_{yy}) = ln(det(R_H + \beta_0 R_{G_0}^{W_0} + \beta_0 R_{G_1}^{W_1} + \sigma^2 I)) + tr\{(R_H + \beta_0 R_{G_0}^{W_0} + \beta_1 R_{G_1}^{W_1} + \sigma^2 I)^{-1} R_{yy}\}. \quad \text{Eq. 26}$$

The average correlation matrix $R(\beta_0, \beta_1, W_0, W_1)$ is defined for the two dominating interferer scenario as shown in Equation 27:

$$R(\beta_0, \beta_1, W_0, W_1) = \quad \text{Eq. 27}$$
$$\frac{1}{N}\sum_{n=0}^{N-1} \begin{pmatrix} H(n)H(n)^H + \beta_0 G_0(n) W_0(n) W_0(n)^H G_0(n)^H + \\ G_1(n) W_1(n) W_1(n)^H G_1(n)^H \end{pmatrix}$$
$$= R_H + \beta_0 R_{G_0}^{W_0} + \beta_1 R_{G_1}^{W_1} + \sigma^2 I.$$

With the average correlation matrix $R(\beta_0, \beta_1, W_0, W_1)$ definition of Equation 27 the channel correlation $R_H$, the first $R_{G_0}^{W_0}$ and second $R_{G_1}^{W_1}$ interfering channel correlation, and the correlation of the received data $R_{yy}$ are shown in Equation 28:

$$R_H = \frac{1}{N}\sum_{n=0}^{N-1}(H(n)H(n)^H), \quad \text{Eq. 28}$$
$$R_{G_0}^{W_0} = \frac{1}{N}\sum_{n=0}^{N-1}(G_0(n)W_0(n)W_0(n)^H G_0(n)^H),$$
$$R_{G_1}^{W_1} = \frac{1}{N}\sum_{n=0}^{N-1}(G_1(n)W_1(n)W_1(n)^H G_1(n)^H),$$
$$R_{yy} = \frac{1}{N}\sum_{n=0}^{N-1}(Y(n)(Y(n)^H).$$

The received data correlation $R_{yy}$ only needs to be calculated once. Thus most of the complexity of calculating the ML metric results from calculating the matrix inversion portion of Equation 26: $R_H + \beta_0 R_{G_0}^{W_0} + \beta_1 R_{G_1}^{W_1} + \sigma^2 I$. Exact ML detection requires searching over all possible combinations of the four unknown values including the two power ratio values and the two effective pre-coding matrices ($\beta_0, \beta_1, W_0, W_1$) in order to find the solution that minimizes the ML metric $\gamma(\beta_0, \beta_1, W_0, W_1)$. However this can be computationally expensive and may be too complex for use in low cost UE. However, much of the complexity can be avoided by using an approximate ML method as described below.

Begin developing the approximate ML method by looking at the relationship shown in Equation 29:

$$E(Y(n)^H Y(n)) = \frac{1}{N}\sum_{Y} Y(n)^H Y(n) = tr(R_{yy}) \quad \text{Eq. 29}$$
$$\approx R_H + \beta_0 tr(R_{G_0}^{W_0}) + \beta_1 tr(R_{G_1}^{W_1}) + M\sigma^2,$$

where M is the number of receive antennas and N is the number of received data samples utilized for interference estimation. With the above approximation the relationship between the two power ratio values ($\beta_0, \beta_1$) can be expressed as shown in Equation 30:

$$\beta_{1-i} \approx \kappa_1(i) - \kappa_2(i) \beta_i, \; i=0,1, \quad \text{Eq. 30}$$

where the constants are defined as shown in Equation 31:

$$\kappa_1(i) = \frac{tr(R_{yy}) - R_H - M\sigma^2}{tr(R_{G_{1-i}}^{W_{1-i}})} \text{ and} \quad \text{Eq. 31}$$
$$\kappa_2(i) = \frac{tr(R_{G_i}^{W_1})}{tr(R_{G_{1-i}}^{W_{1-i}})}.$$

By using this linear relationship, joint detection of the two power ratio values ($\beta_0, \beta_1$) can be approximated by estimating one of the power ratio value first, then approximating the second power ratio value with the linear relationship shown in Equation 30. It can be seen by the definitions shown in Equation 31 that the second value, $\kappa_2(i)$, measures the interference power between two interferers. It is beneficial to estimate the interferer with the higher interfering power first, thus the first power ratio to be estimated, denoted as $\beta_t$ where the subscript t equals 0 or 1 to indicate the first or second dominating interferer, satisfies the condition shown in Equation 32:

$$\kappa_2(t) \leq 1 \text{ and} \quad \text{Eq. 32}$$
$$\kappa_2(1-t) = \frac{1}{\kappa_2(t)} \geq 1.$$

In certain circumstances $\kappa_2(0) = \kappa_2(1) = 1$ indicating both interfering cells have equal or substantially power. When this occurs other criteria may be used to select which interfering cell power ratio to estimate. In these situations it is beneficial to start with the interfering cell that has better channel estimation accuracy.

Using the assumptions described above the ML metric $\gamma(\beta_0, \beta_1, W_0, W_1)$ can now be computed using the approximate average correlation matrix $R(\beta_0, \beta_1, W_0, W_1)$ as shown in Equation 33:

$$R(\beta_0, \beta_1, W_0, W_1) = R_H + \beta_0 R_{G_0}^{W_0} + \beta_1 R_{G_1}^{W_1} + \sigma^2 I \approx \quad \text{Eq. 33}$$
$$R_H + \beta_1 R_{G_1}^{W_1} + (\kappa_1(t) - \kappa_2(t)\beta_t) R_{G_{1-t}}^{W_{1-t}} + \sigma^2 I =$$
$$\beta_t (R_{G_t}^{W_t} - \kappa_2(t) R_{G_{1-t}}^{W_{1-t}}) + \kappa_1(t) R_{G_{1-t}}^{W_{1-t}} + R_H + \sigma^2 I =$$
$$\beta_t \Delta + \kappa_1(t) R_{G_{1-t}}^{W_{1-t}} + R_H + \sigma^2 I,$$

where $\Delta = R_{G_t}^{W_t} - \kappa_2(t) R_{G_{1-t}}^{W_{1-t}}$.

The matrix operations described above with reference to a single dominating interferer may also be applied to the ML metric for two dominating interferers to reduce the computational complexity associated with the required matrix inversions. Begin by applying Cholesky decomposition to the interfering channel correlations as shown in Equation 34:

$$\kappa_1(t) R_{G_{1-t}}^{W_{1-t}} + R_H + \sigma^2 = LL^H. \quad \text{Eq. 34}$$

Next assume spectral decomposition: $V\Sigma V^H = L^{-1} \Delta (L^{-1})^H$, where V is a unitary matrix and $\Sigma$ is the corresponding diagonal matrix: $\Sigma = diag(\lambda_0 \lambda_1 \ldots \lambda_{k-1})$ formed from the Eigenvalues $\lambda$. Using these decompositions the matrix inversion can be written as shown in Equation 35:

$$\left(\beta_t \Delta + \kappa_1(t) R_{G_{1-t}}^{W_{1-t}} + R_H + \sigma^2 I\right)^{-1} = (\beta_1 \Delta + LL^H)^{-1} \quad \text{Eq. 35}$$
$$= (L^{-1})^H \left(\beta_1 L^{-1} \Delta (L^{-1})^H + I\right)^{-1} L^{-1}$$
$$= (L^{-1})^H V (\beta_1 \Sigma + I)^{-1} V^H L^{-1}.$$

With the above assumptions the ML metric $\gamma(\beta_0, \beta_1, W_0, W_1)$ can be approximated as shown in Equation 36:

$$\gamma(\beta_0, \beta_1, W_0, W_1) \propto \quad \text{Eq. 36}$$
$$ln\left(\det\left(\beta_t \Delta + \kappa_1(t) R_{G_{1-t}}^{W_{1-t}} + R_H + \sigma^2 I\right)\right) +$$
$$tr\left\{\left(\beta_t \Delta + \kappa_1(t) R_{G_{1-t}}^{W_{1-t}} + R_H + \sigma^2 I\right)^{-1} R_{yy}\right\} =$$
$$ln(\det(\beta_t \Delta + LL^H)) +$$
$$tr\left\{(L^{-1})^H V (\beta_t \Sigma + I)^{-1} V^H L^{-1} R_{yy}\right\} \propto$$
$$ln(\det(\beta_t \Sigma + I)) + tr\{(\beta_t \Sigma + I)^{-1} D\} =$$
$$\sum_{i=0}^{M-1} ln(\beta_t \lambda_i + 1) + \sum_{i=0}^{M-1} \frac{D_i}{\beta_t \lambda_i + 1},$$

where $D_i$ is the i-th diagonal element of matrix $D = V^H L^{-1} R_{yy} (L^{-1})^H V$, and $R_{yy}$ represents the received signal correlation matrix averaged over all N samples as described above. Because $D_i$ and the $i^{th}$ Eigenvalue $\lambda_i$ only need to calculated once, the complexity of calculating the ML metric $\gamma(\beta_0, \beta_1, W_0, W_1)$ for all possible values of the first power ratio $\beta_t$ can be calculated using Equation 36. The partial derivative of the metric $\gamma(\beta_0, \beta_1, W_0, W_1)$ with respect to the first power ratio $\beta_t$ is shown in Equation 37:

$$\frac{\partial \gamma(\beta_0, \beta_1, W_0, W_1)}{\partial \beta_t} = \quad \text{Eq. 37}$$
$$\sum_{i=0}^{M-1} \frac{\lambda_i}{\beta_t \lambda_i + 1} \sum_{i=0}^{M-1} \frac{\lambda_i D_i}{(\beta_t \lambda_i + 1)^2} = \sum_{i=0}^{M-1} \frac{\lambda_i (\beta_t \lambda_i + 1 - D_i)}{(\beta_t \lambda_i + 1)^2} = 0.$$

When the number of receive antennas M is equal to 2, a closed form solution can be obtained. When M is larger than 2 the ML metric $\gamma(\beta_0, \beta_1, W_0, W_1)$ can be calculated directly for all power ratio values and a minimum value may be found. The power ratio value is always positive indicating $\beta_{1-t} = \kappa_1(t) - \kappa_2(t) \beta_t \geq 0$ resulting in the relationship shown in Equation 38:

$$\beta_t 23 \ \kappa_1(t)/\kappa_2(t). \quad \text{Eq. 38}$$

Thus, only the values of $\beta_t$ no larger than $\kappa_1(t)/\kappa_2(t)$ need to be evaluated.

Figure 4:
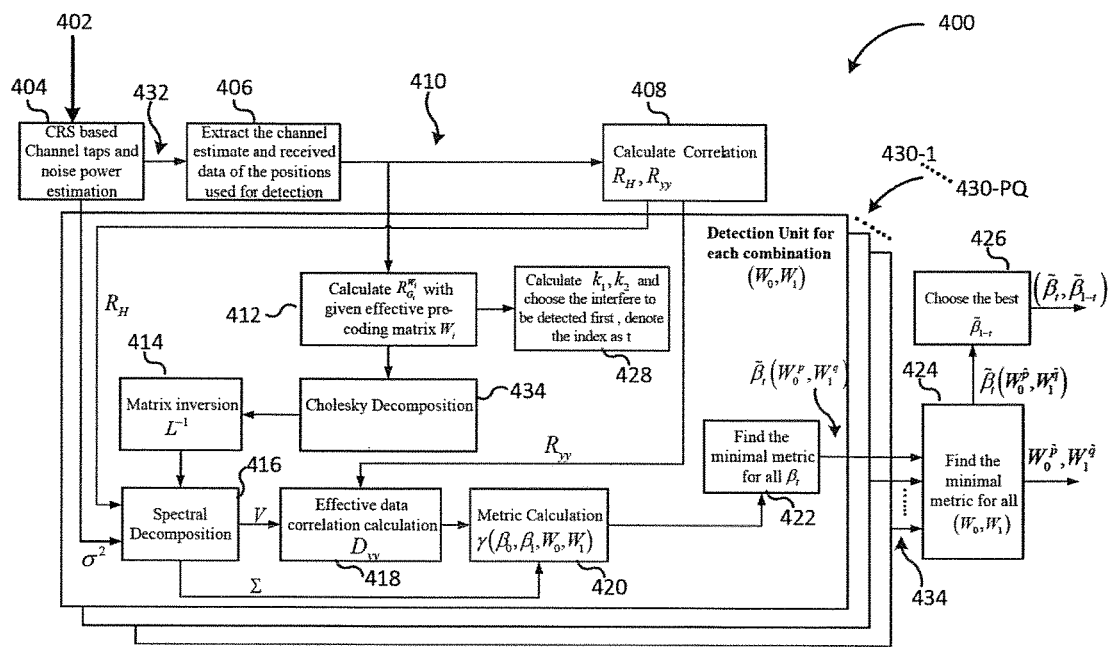
FIG. 4 illustrates a flow chart of an ML based power ratio detection process for two dominating interferers incorporating aspects of the disclosed embodiments.

FIG. 4 illustrates a flow chart of an exemplary embodiment of a ML based power ratio detection process 400 which can be performed by an apparatus (e.g. by a processor of the apparatus) according to an embodiment of the present disclosure incorporating aspects of the disclosed embodiments. The power ratio detection process 400 may be advantageously employed in a UE experiencing interference from two dominating interferers. Received radio frequency signals are down converted and appropriately pre-processed to create a base band signal which is digitally sampled, such as with an analog to digital converter, to create a received digital communication signal 402. CRS based channel taps and noise power estimation are used to extract 404 noise power estimates $\sigma^2$ and channel estimates 432. The channel estimates and received data 410 of the positions used for detection are extracted 406, and the data correlation $R_{yy}$ and the channel correlation $R_H$ are calculated 408.

Computation of the power ratio values for a given pre-coding matrix assumption is not dependent on other pre-coding matrix assumptions. Therefore, the process of determining a power ratio value for each of the effective pre-coding matrix assumptions can be done in parallel. Separate processing for each pre-coding matrix value is represented by a set of detection units 430-1 through 430-PQ. A finite set of different assumptions for the possible effective pre-coding matrices will be considered: $\{W_0^p, W_1^q\}_{0 \leq p < P_0, 0 \leq q < P_1}$, where $P_i$ (i=0,1) indicates the first or second interferer, p is the number of effective pre-coding matrix assumptions for the first interferer and q is the number of effective pre-coding matrix assumptions or the second interferer. Thus there will be p times q separate detection units 430-1 through 430-PQ. A separate detection unit 430-1 through 430-PQ is created for each effective pre-coding matrix assumption, where each pre-coding matrix assumption includes a pair of effective pre-coding matrices $(W_0^p, W_1^q)$; one for the first interferer $W_0^p$ and one for the second interferer $W_1^q$. Each detection unit 430-1 through 430-PQ receives the noise power estimates $\sigma^2$, channel estimates 432, the data correlation $R_{yy}$, and the channel correlation $R_H$, which were derived from the received digital communication signal 402, and all the detection units 430-1 through 430-PQ use the same process to determine a power ratio estimate $\tilde{\beta}_1(W_0^p, W_1^q)$ for each effective pre-coding matrix assumption $(W_0^p, W_1^q)$. The $k_1$ and $k_2$ constants are determined 428 as shown in Equation 32 and a first dominating interferer is selected based on the interferer having the higher interfering power or the better estimation accuracy as described above. An interfering channel correlation $R_{G_1}^{W_i}$ is calculated 412 for the first dominating interferer as shown for example in Equation 28, based on the particular effective pre-coding matrix assumption $(W_0^p, W_1^q)$. Cholesky decomposition is performed 434 to create a triangular matrix L as illustrated in Equation 34. The triangular matrix L is then inverted 414 to create an inverse matrix $L^{-1}$. Spectral decomposition 416 is applied to the channel correlation $R_H$, the noise power $\sigma^2$, and the inverted triangular matrix $L^{-1}$ as illustrated in Equation 35 to create a unitary matrix V and a corresponding diagonal matrix $\Sigma$. The effective data correlation $D_{yy}$ is calculated 418 from the received data correlation $R_{yy}$ and the unitary matrix V. The metric calculations 420 can then be performed on the data correlation $D_{yy}$ and the diagonal matrix $\Sigma$ as illustrated in Equation 36. The best power ratio estimate $\tilde{\beta}_t(W_0^p W_1^q)$ in an ML sense is then selected 422 based on the metric calculations 420.

Each detection unit 430-1 through 430-PQ selects 422 the best power ratio estimate $\tilde{\beta}_t(W_0^p, W_1^q)$ corresponding to one set of effective pre-coding matrices $(W_0^p, W_1^q)$ based on ML criteria as shown in Equation 39:

$$\tilde{\beta}_t(W_0^p, W_1^q) = \underset{\beta_t \in \Omega}{\operatorname{argmin}} \gamma(\beta_0, \beta_1, W_0^p, W_1^q). \quad \text{Eq. 39}$$

The best estimated power ratio for the first interferer $\tilde{\beta}_t$ and set of effective pre-coding matrices $(W_0^p, W_1^q)$ is then selected 424 among the set of estimates 434 produced by the detection units 430-1 through 430-PQ based on a ML criteria as shown in Equation 40:

$$\left(W_0^{\hat{p}}, W_1^{\hat{q}}\right) = \underset{0 \leq p < P_0, 0 \leq q < P_i}{\mathrm{argmin}} \gamma\left(\tilde{\beta}_t(W_0^p, W_1^q), W_0^p, W_1^q\right). \qquad \text{Eq. 40}$$

The estimated power ratio for the second interferer $\tilde{\beta}_{1-t}$ is chosen 426 based on the criteria shown in Equation 41:

$$\tilde{\beta}_{1-t} = \underset{\tilde{\beta}_{1-t} \in \Omega}{\mathrm{argmin}}\left\{\left|\beta_{1-t} - (k_1(t) - k_2(t)\tilde{\beta}_t)\right|\right\}. \qquad \text{Eq. 41}$$

Once the best estimate of the power ratio values $\tilde{\beta}_t(W_0^p, W_1^q)$ and effective pre-coding matrices $(W_0^{\hat{p}}, W_1^{\hat{q}})$ have been found as described above, the best channel covariance matrix R can be reconstructed using Equation 42:

$$R = R_H + \tilde{\beta}_0 R_{G_0}^{W_0 \hat{p}} + \tilde{\beta}_1 R_{G_1}^{W_1 \hat{q}} + \sigma^2 I, \qquad \text{Eq. 42}$$

where the channel correlation $R_H$ is the same as is defined above and the first and second interfering channel correlations $R_{G_0}^{W_0 \hat{p}}, R_{G_1}^{W_1 \hat{q}}$ are calculated based on the optimal effective pre-coding matrices as shown in Equation 43:

$$R_{G_0}^{W_0^{\hat{p}}} = \frac{1}{N}\sum_{n=0}^{N-1}\left(G_0(n)W_0^{\hat{p}}(n)W_0^{\hat{p}}(n)^H G_0(n)^H\right) \qquad \text{Eq. 43}$$

$$R_{G_1}^{W_1^{\hat{q}}} = \frac{1}{N}\sum_{n=0}^{N-1}\left(G_1(n)W_1^{\hat{q}}(n)W_1^{\hat{q}}(n)^H G_1(n)^H\right).$$

The IRC can then be implemented with based on the channel covariance matrix R. Because the reconstructed channel covariance matrix R has improved accuracy, the UE will experience increased throughput while experience ICI.

Apparatus

Figure 5:
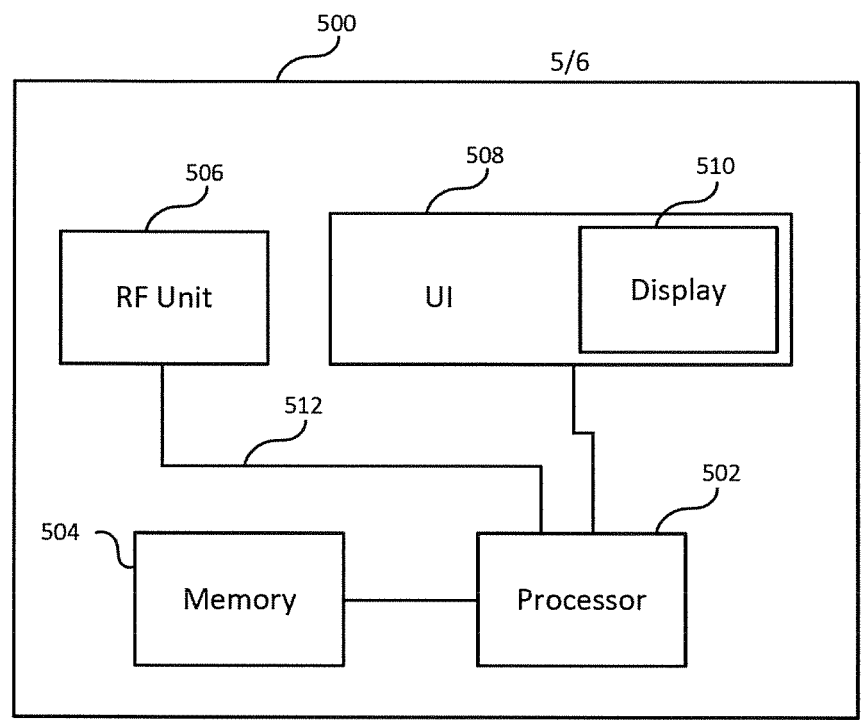
FIG. 5 illustrates a block diagram of a mobile device incorporating aspects of the present disclosure.

FIG. 5 illustrates a block diagram of a mobile device 500 incorporating aspects of the present disclosure. The mobile device 500 is appropriate for implementing the interference estimation processes described above. The illustrated mobile device 500 includes a processor 502 coupled to a memory 504, a radio frequency (RF) unit 506, a user interface (UI) 508, and a display 510. The apparatus 500 is appropriate for use as a mobile device which may be any of various types of wireless communications user equipment such as cell phones, smart phones, or tablet devices.

The processor 502 may be a single processing device or may comprise a plurality of processing devices including special purpose devices such as for example it may include digital signal processing (DSP) devices, microprocessors, or other specialized processing devices as well as one or more general purpose computer processors. The processor is configured to perform the before mentioned interference estimation processes. The processor 502 is coupled to a memory 504 which may be a combination of various types of volatile and/or non-volatile computer memory such as for example read only memory (ROM), random access memory (RAM), magnetic or optical disk, or other types of computer memory. The memory 504 stores computer program instructions that may be accessed and executed by the processor 502 to cause the processor 502 to perform a variety of desirable computer implemented processes or methods. The program instructions stored in memory 504 may be organized as groups or sets of program instructions referred to by those skilled in the art with various terms such as programs, software components, software modules, units, etc., where each program may be of a recognized type such as an operating system, an application, a device driver, or other conventionally recognized type of software component. Also included in the memory 504 are program data and data files which are stored and processed by the computer program instructions.

The RF unit 506 is coupled to the processor 502 and configured to transmit and receive RF signals based on digital data 512 exchanged with the processor 502. The RF unit 506 is configured to transmit and receive radio signals that may conform to one or more of the wireless communication standards in use today, such as for example LTE, LTE-A, Wi-fi, as well as many others. The RF unit 506 may receive radio signals from one or more antennas, down-convert the received RF signal, perform appropriate filtering and other signal conditioning operations, then convert the resulting baseband signal to a digital signal by sampling with an analog to digital converter. The digitized baseband signal also referred to herein as a digital communication signal is then sent 512 to the processor 502.

The UI 508 may include one or more user interface elements such as a touch screen, keypad, buttons, voice command processor, as well as other elements adapted for exchanging information with a user. The UI 508 may also include a display unit 510 configured to display a variety of information appropriate for a mobile device or UE 500 and may be implemented using any appropriate display type such as for example organic light emitting diodes (OLED), liquid crystal display (LCD), as well as less complex elements such as LEDs or indicator lamps, etc. In certain embodiments the display unit 510 incorporates a touch screen for receiving information from the user of the mobile device 500. The mobile device 500 is appropriate for implementing embodiments of the apparatus and methods disclosed herein.

Figure 6:
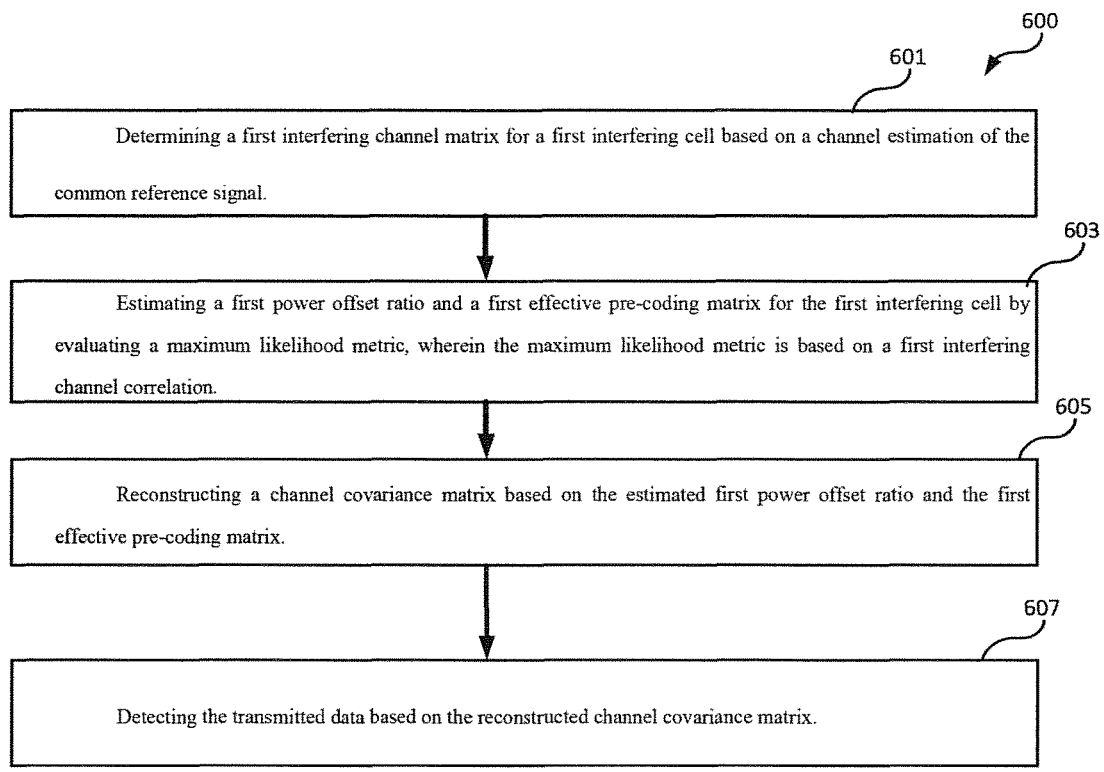
FIG. 6 illustrates a flow diagram of a method for estimating interference in a digital communication signal according to an embodiment.

FIG. 6 shows a flow diagram of a method 600 for estimating interference in a digital communication signal, wherein the digital communication signal comprises a common reference signal and a transmitted data according to an embodiment.

The method 600 comprises a step 601 of determining a first interfering channel matrix for a first interfering cell based on a channel estimation of the common reference signal, a step 603 of estimating a first power offset ratio and a first effective pre-coding matrix for the first interfering cell by evaluating a maximum likelihood metric, wherein the maximum likelihood metric is based on a first interfering channel correlation, a step 605 of reconstructing a channel covariance matrix based on the estimated first power offset ratio and the first effective pre-coding matrix and s step 607 of detecting the transmitted data based on the reconstructed channel covariance matrix. The method 600 can be performed by the apparatus 500 shown in FIG. 5. The step 603 of estimating the power offset ratio and the effective pre-coding matrix can be performed as described in conjunction with FIGS. 3 and 4. In other words, the processes shown in FIGS. 3 and 4 provide a possible implementation for step 603.

Thus, while there have been shown, described and pointed out, fundamental novel features of the disclosure as applied to the exemplary embodiments thereof, it will be understood that various omissions, substitutions and changes in the form and details of devices and methods illustrated, and in their operation, may be made by those skilled in the art without departing from the spirit and scope of the disclosure. Further, it is expressly intended that all combinations of those elements, which perform substantially the same function in substantially the same way to achieve the same results, are within the scope of the disclosure. Moreover, it should be recognized that structures and/or elements shown and/or described in connection with any disclosed form or embodiment of the disclosure may be incorporated in any other disclosed or described or suggested form or embodiment as a general matter of design choice. It is the intention, therefore, to be limited only as indicated by the scope of the claims appended hereto.

What is claimed is:

1. An apparatus, comprising:
a non-transitory memory configured to store program code instructions; and
a processor coupled to the memory, wherein the program code instructions, when executed by the processor, cause the processors to:
receive a digital communication signal, wherein the digital communication signal comprises a common reference signal and transmitted data,
determine a first interfering channel matrix for a first interfering cell based on a channel estimation of the common reference signal,
estimate a first power offset ratio and a first effective pre-coding matrix for the first interfering cell by evaluating a maximum likelihood metric, wherein the maximum likelihood metric is based on a first interfering channel correlation,
reconstruct a channel covariance matrix based on the estimated first power offset ratio and the first effective pre-coding matrix, and
detect the transmitted data based on the reconstructed channel covariance matrix.

2. The apparatus of claim 1, wherein the program instructions, when executed by the processor, further cause the processor to:
evaluate the maximum likelihood metric based on an average covariance matrix.

3. The apparatus of claim 1, wherein the program instructions, when executed by the processor, further cause the processor to:
generate a triangular matrix using Cholesky factorization of the first interfering channel correlation;
invert the triangular matrix; and
evaluate the maximum likelihood metric based on a spectral decomposition of the inverted triangular matrix and a channel correlation.

4. The apparatus of claim 1, wherein the program code instructions, when executed by the processor, further cause the processor to:
estimate a set of power offset ratios corresponding to a set of possible effective pre-coding matrices, wherein each power offset ratio in the set of power offset ratios corresponds to one possible effective pre-coding matrix in the set of possible effective pre-coding matrices, and wherein the set of power offset ratios are determined in parallel.

5. The apparatus of claim 4, wherein the program code instructions, when executed by the processor, further cause the processor to:
evaluate a product of each effective pre-coding matrix and the conjugate transpose of the each effective pre-coding matrix; and
remove an effective pre-coding matrix from the set of effective pre-coding matrices when the corresponding evaluated product is a duplicate of the evaluated product corresponding to another effective pre-coding matrix in the set of effective pre-coding matrices.

6. The apparatus of claim 4, wherein the program code instructions, when executed by the processor, further cause the processor to:
perform selecting the first power offset ratio from the set of power offset ratios based on the maximum likelihood metric.

7. The apparatus of claim 1, wherein the program code instructions, when executed by the processor, further cause the processor to:
estimate a second power offset ratio and a second effective pre-coding matrix corresponding to a second interfering cell by:
evaluating a maximum likelihood metric, wherein the maximum likelihood metric is based on the first interfering channel correlation and a second interfering channel correlation, and
reconstructing the channel covariance matrix based on the estimated first power offset ratio, the second power offset ratio, the first effective pre-coding matrix, and the second effective pre-coding matrix.

8. The apparatus of claim 7, wherein the program code instructions, when executed by the processor, further cause the processor to:
approximate a joint detection of the first power offset ratio and the second power offset ratio by estimating the first power offset ratio based on a maximum likelihood metric, and estimating the second power offset ratio based on a linear relationship between the first power offset ratio and the second power offset ratio.

9. The apparatus of claim 8, wherein the program code instructions, when executed by the processor, further cause the processor to:
select the first power offset ratio based on the interfering power of the first interfering cell and the interfering power of the second interfering cell, wherein the interfering power of the first interfering cell is greater than the interfering power of the second interfering cell.

10. The apparatus of claim 7, wherein the program code instructions, when executed by the processor, further cause the processor to:
when the first interfering cell and the second interfering cell have substantially the same interfering power, select as the first interfering cell the interfering cell having better estimation accuracy.

11. The apparatus of claim 1, wherein the program code instructions, when executed by the processor, further cause the processor to:
detect the transmitted data based on interference rejection combining type receivers.

12. The apparatus of claim 1, wherein the program code instructions, when executed by the processor, further cause the processor to:
select the first power offset ratio from a set of possible power offset ratios wherein the set of possible power offset ratios includes a zero value.

13. A method for estimating interference in a digital communication signal, wherein the digital communication signal comprises a common reference signal and a transmitted data, the method comprising:
determining a first interfering channel matrix for a first interfering cell based on a channel estimation of the common reference signal;
estimating a first power offset ratio and a first effective pre-coding matrix for the first interfering cell by evaluating a maximum likelihood metric, wherein the maximum likelihood metric is based on a first interfering channel correlation;

reconstructing a channel covariance matrix based on the estimated first power offset ratio and the first effective pre-coding matrix; and detecting the transmitted data based on the reconstructed channel covariance matrix.

14. The method according to claim 13, wherein evaluating the maximum likelihood metric comprises:

generating a triangular matrix using Cholesky factorization of the first interfering channel correlation;

inverting the triangular matrix; and evaluating the maximum likelihood metric based on a spectral decomposition of the inverted triangular matrix and a channel correlation.

15. The method according to claim 13, wherein evaluating a maximum likelihood metric comprises evaluating the maximum likelihood metric based on an average covariance matrix.

16. A non-transitory memory for storing computer-readable program comprising program code that, when executed by a processor, causes the processor to:

receive a digital communication signal, wherein the digital communication signal comprises a common reference signal and transmitted data;

determine a first interfering channel matrix for a first interfering cell based on a channel estimation of the common reference signal;

estimate a first power offset ratio and a first effective pre-coding matrix for the first interfering cell by evaluating a maximum likelihood metric, wherein the maximum likelihood metric is based on a first interfering channel correlation;

reconstruct a channel covariance matrix based on the estimated first power offset ratio and the first effective pre-coding matrix; and detect the transmitted data based on the reconstructed channel covariance matrix.

17. The non-transitory memory of claim 16, wherein the program code, when executed by a processor, further causes the processor to:

evaluate the maximum likelihood metric based on an average covariance matrix.

18. The non-transitory memory of claim 16, wherein the program code, when executed by a processor, further causes the processor to:

generate a triangular matrix using Cholesky factorization of the first interfering channel correlation;

invert the triangular matrix; and evaluate the maximum likelihood metric based on a spectral decomposition of the inverted triangular matrix and a channel correlation.

19. The non-transitory memory of claim 16, wherein the program code, when executed by the processor, further causes the processor to:

detect the transmitted data based on interference rejection combining type receivers.

20. The non-transitory memory of claim 16, wherein the program code, when executed by the processor, further causes the processor to:

select the first power offset ratio from a set of possible power offset ratios wherein the set of possible power offset ratios includes a zero value.

* * * * *